(12) United States Patent
Cheong et al.

(10) Patent No.: US 7,272,840 B2
(45) Date of Patent: Sep. 18, 2007

(54) OBJECTIVE LENS DRIVING APPARATUS USED WITH AN OPTICAL PICKUP

(75) Inventors: Young-min Cheong, Seoul (KR); Kwang Kim, Gyeonggi-do (KR); Dae-hwan Kim, Seoul (KR); Jin-won Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 541 days.

(21) Appl. No.: 10/647,134

(22) Filed: Aug. 25, 2003

(65) Prior Publication Data
US 2004/0123309 A1    Jun. 24, 2004

Related U.S. Application Data

(63) Continuation-in-part of application No. 10/622,785, filed on Jul. 21, 2003, now abandoned.

(30) Foreign Application Priority Data

Aug. 24, 2002 (KR) ............................... 2002-50305
Aug. 12, 2003 (KR) ............................... 2003-55873

(51) Int. Cl.
*G11B 7/08* (2006.01)
*G11B 7/085* (2006.01)
*G11B 7/09* (2006.01)

(52) U.S. Cl. .................. 720/683; 369/44.15; 369/44.22
(58) Field of Classification Search ................ 720/683, 720/685; 369/44.14, 44.15, 44.22, 44.32
See application file for complete search history.

(56) References Cited

U.S. PATENT DOCUMENTS 5,303,089 A    4/1994    Ohno (Continued)

FOREIGN PATENT DOCUMENTS

CN    1335613 A    2/2002

(Continued)

OTHER PUBLICATIONS

Japanese Office Action dated Oct. 25, 2005 issued in co-pending Japanese Patent Application No. 2003-298735.

(Continued)

*Primary Examiner*—William J Klimowicz
(74) *Attorney, Agent, or Firm*—Stein, McEwen & Bui, LLP

(57) ABSTRACT

An objective lens driving apparatus used with an optical pickup includes a base, a holder provided on the base, a blade on which an objective lens is mounted, an elastic support body elastically supporting the blade and which is capable of moving with respect to the holder, a pair of magnetic members installed on the base to face each other, and a coil assembly including a focus coil, a tracking coil, and a tilt coil, the coil assembly being installed at the blade so as to be disposed between the magnetic members. Thus, coils needed to change the position of an objective lens are incorporated into a single coil assembly and are arranged between a pair of magnets, and an installation space is small so that the apparatus can be made compact.

7 Claims, 14 Drawing Sheets

U.S. PATENT DOCUMENTS

| | | |
|---|---|---|
| 6,288,984 B1 | 9/2001 | Kawano et al. |
| 6,466,529 B1 * | 10/2002 | Kim et al. ............... 369/44.32 |
| 6,724,696 B2 * | 4/2004 | Kim et al. ............... 369/44.16 |
| 2002/0006090 A1 | 1/2002 | Kawano |
| 2003/0012090 A1 * | 1/2003 | Kawano ............... 369/44.16 |
| 2003/0021218 A1 * | 1/2003 | Song et al. ............... 369/244 |
| 2003/0039185 A1 * | 2/2003 | Ikawa et al. ............. 369/44.32 |
| 2003/0193854 A1 * | 10/2003 | Lee et al. ................ 369/44.16 |

FOREIGN PATENT DOCUMENTS

| | | |
|---|---|---|
| EP | 0737963 | 3/1996 |
| EP | 1271494 A2 * | 1/2003 |
| EP | 1 394 783 A2 | 3/2004 |
| JP | 04-034736 | 2/1992 |
| JP | 06-004885 | 1/1994 |
| JP | 06-251405 | 9/1994 |
| JP | 9-259453 | 10/1997 |
| JP | 10-334485 | 12/1998 |
| JP | 11-259877 | 9/1999 |
| JP | 11-283258 | 10/1999 |
| JP | 11-339290 | 12/1999 |
| JP | 2000-67444 | 3/2000 |
| JP | 2000-149292 | 5/2000 |
| JP | 2000-293874 | 10/2000 |
| JP | 2001-014698 | 1/2001 |
| JP | 2001155358 A * | 6/2001 |
| JP | 2001-184683 | 7/2001 |
| JP | 2001-319343 | 11/2001 |
| JP | 2002-092916 | 3/2002 |
| JP | 2002140828 A * | 5/2002 |
| JP | 2002184001 A * | 6/2002 |
| JP | 2002-245646 | 8/2002 |
| JP | 2003-173556 | 6/2003 |
| JP | 2003-173557 | 6/2003 |

OTHER PUBLICATIONS

European Examination Report issued in EU Pat. App. No.: 03255283.8-1239 on Jan. 3, 2006.

* cited by examiner

OBJECTIVE LENS DRIVING APPARATUS USED WITH AN OPTICAL PICKUP

CROSS-REFERENCE TO RELATED APPLICATIONS

This application is a continuation in part of U.S. patent application Ser. No. 10/622,785, filed Jul. 21, 2003, now abandoned, which claims the benefit of Korean Patent Application No. 2002-50305, filed Aug. 24, 2002 in the Korean Intellectual Property Office, the disclosures of which are incorporated herein by reference. This application further claims the benefit of Korean Patent Application No. 2002-50305, filed Aug. 24, 2002 in the Korean Intellectual Property Office, and Korean Patent Application No. 2003-55873, filed Aug. 12, 2003 in the Korean Intellectual Property Office, the disclosures of which are incorporated herein by reference.

BACKGROUND OF THE INVENTION

1. Field of the Invention

The present invention relates to an objective lens driving apparatus used with an optical pickup.

2. Description of the Related Art

In general, disk drives record and/or reproduce information to and/or from a disk or a recording medium by emitting light thereon. The disk drives include a turntable on which a disk is placed, a spindle motor rotating the turntable, and an optical pickup emitting light on a recording surface of the disk to perform recording and/or reproduction.

However, the light emitted from the optical pickup must be perpendicularly incident on the recording surface of the disk to form an accurate light spot. If the incident direction of light is inclined, an accurate light spot cannot be formed on the disk and, an error is generated in recording and reproduction of data. Thus, in order to form an accurate light spot on a desired track of a disk, the light needs to be perpendicularly incident on the recording surface of the disk. Adjusting the light to be perpendicularly incident on the recording surface of the disk is referred to as tilt adjustment or skew adjustment. Typically, an objective lens driving apparatus controls the position of an objective lens in a focusing direction and a tracking direction so that the focus of light can be accurately formed on a desired track of the recording surface of the disk. However, the objective lens driving apparatus maintains the focus of a light spot by maintaining a constant distance between the objective lens and the recording surface of the disk and controls the light spot to follow a desired track, but it does not directly control an incident angle of the light with respect to the recording surface of the disk. Thus, for more precise recording and reproduction, an operation of dynamically adjusting the tilt is needed.

To meet the needs stated above, as shown in FIGS. 1 and 2, a conventional objective lens driving apparatus of an optical pickup having a dynamic tilt adjustment mechanism has been suggested. The optical pickup shown in the drawing is an objective lens driving mechanism which includes a focus and tracking adjustment mechanism driving a blade 2 where an objective lens 1 is mounted in a focus direction A and a tracking direction B, and a tilt adjustment mechanism driving the blade 2 in a tilt direction C.

The focus and tracking adjustment mechanism has a typical structure including a focus coil 3, tracking coils 4, and a magnet 8. Thus, the focus and tracking adjustment mechanism generates an electromagnetic force to drive the blade 2 by controlling currents flowing through the focus coil 3 and the tracking coils 4. Reference numeral 5 denotes a wire supporting the blade 2 to move with respect to the holder 6.

The tilt adjustment mechanism includes steel wires 17a and 17b inserted in bosses 16a and 16b on a base 10, tilt coils 15a and 15b wound around the bosses 16a and 16b, and tilt magnets 14a and 14b installed at the blade 2 to face the steel wires 17a and 17b. Thus, the steel wires 17a and 17b are magnetized according to the direction of current flowing in the tilt coils 15a and 15b. The blade 2 is driven in the tilt direction C by the magnetic operation between the magnetized steel wires 17a and 17b and the tilt magnets 14a and 14b.

In the above structure, since constituent elements of the tilt adjustment mechanism, such as the tilt coils 15a and 15b, are installed in an additional space on the base 10 separated from the space for the focus and tracking adjustment mechanism, it is difficult to make a compact objective lens driving apparatus. Also, since the tilt magnets 14a and 14b, which are relatively heavy bodies, are installed on the blade 2 which is a driving portion, a response speed is reduced due to the heavy weight of the driving portion. Therefore, a structure which can perform accurate lens driving control and tilt control between the disk and the optical pickup is needed.

SUMMARY OF THE INVENTION

In order to solve the above and/or other problems, it is an aspect of the present invention to provide an objective lens driving apparatus of an optical pickup which can smoothly control driving of an objective lens without increasing the size of the apparatus or the weight of a driving portion.

Additional aspects and advantages of the invention will be set forth in part in the description which follows and, in part, will be obvious from the description, or may be learned by practice of the invention.

The foregoing and/or other aspects of the present invention are achieved by providing an objective lens driving apparatus used with an optical pickup comprising: a base, a holder provided on the base, a blade on which an objective lens is mounted, an elastic support body elastically supporting the blade capable of moving with respect to the holder, a pair of magnetic members installed on the base to face each other, and a coil assembly including a focus coil, a tracking coil, and a tilt coil and installed at the blade so as to be disposed between the magnetic members.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE EMBODIMENTS

Figure 1:
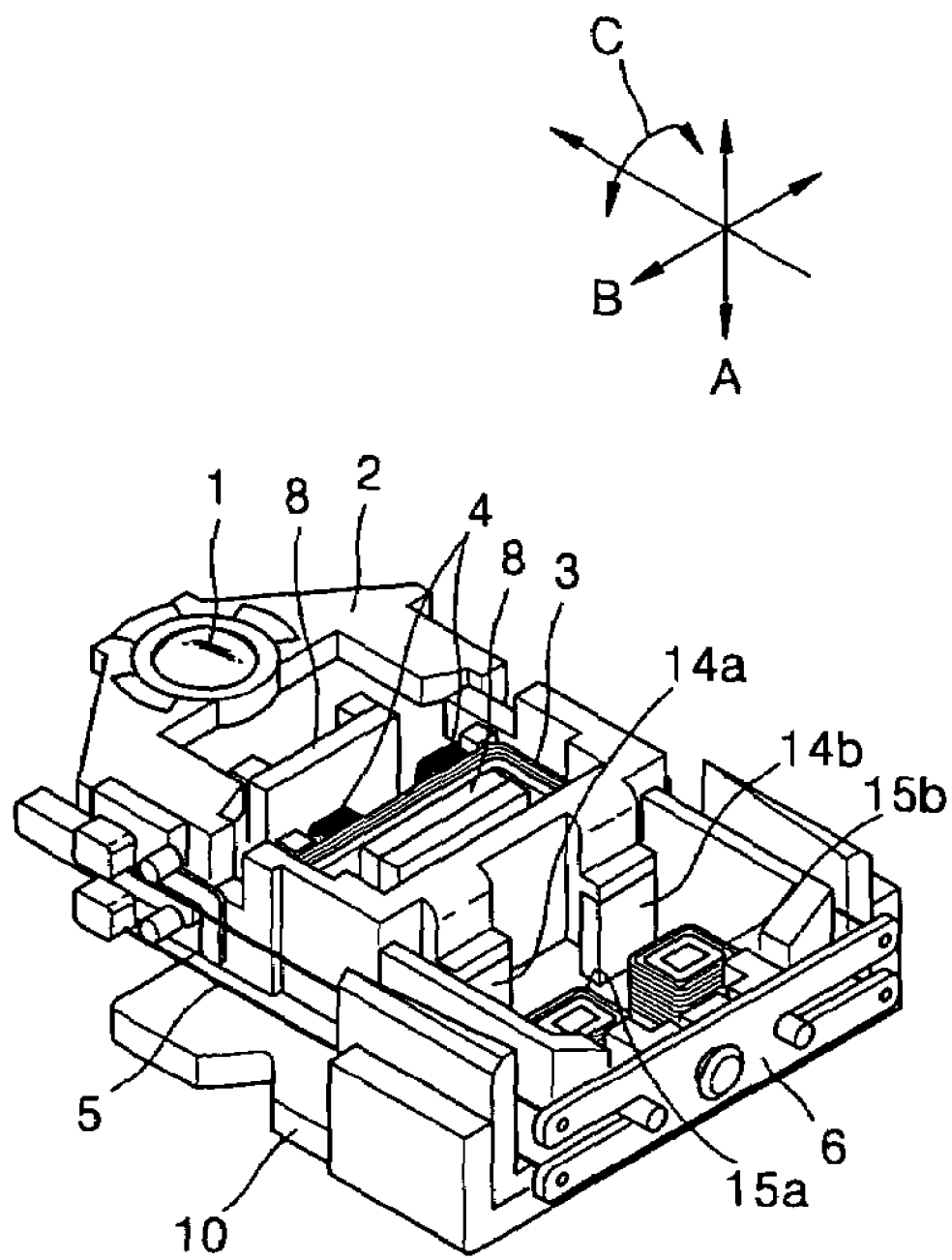
FIG. 1 is a perspective view illustrating a conventional objective lens driving apparatus.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
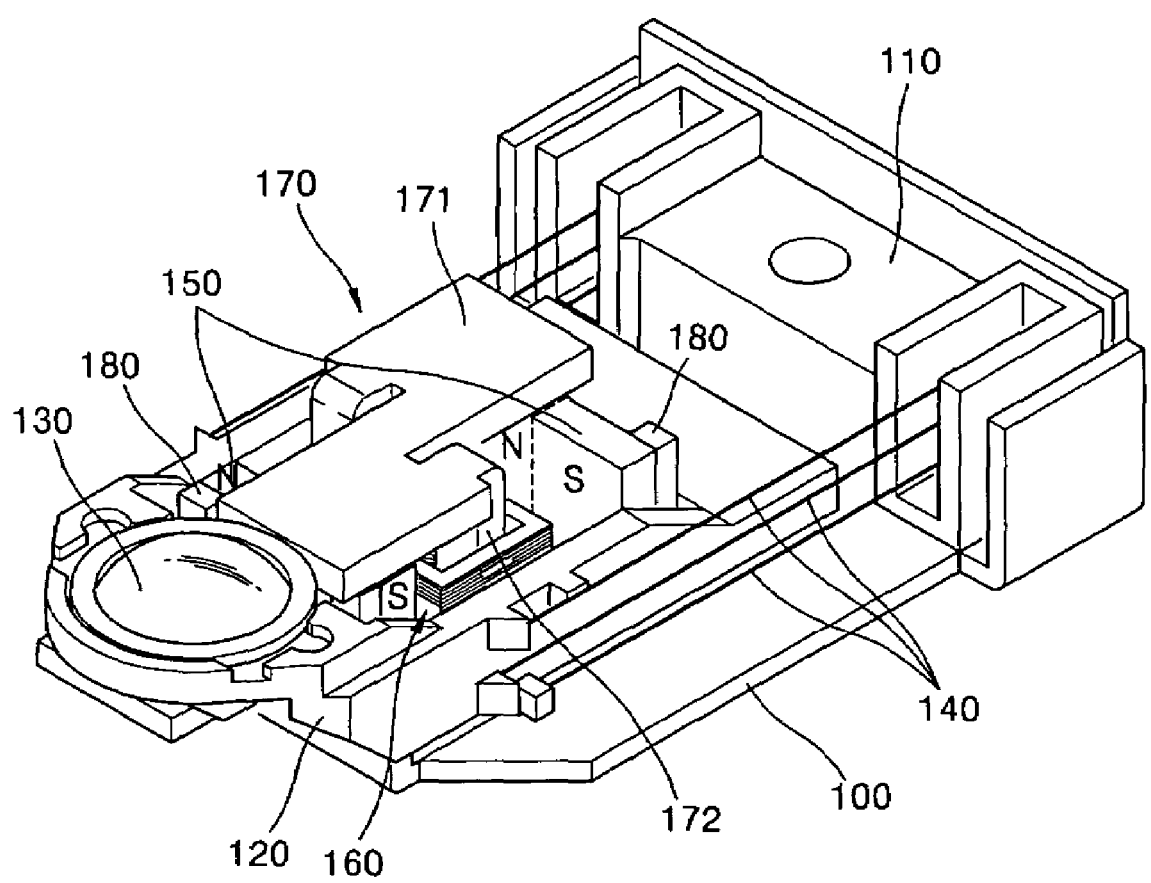
FIG. 3 is a perspective view illustrating an objective lens driving apparatus according to an embodiment of the present invention.
Figure 4:
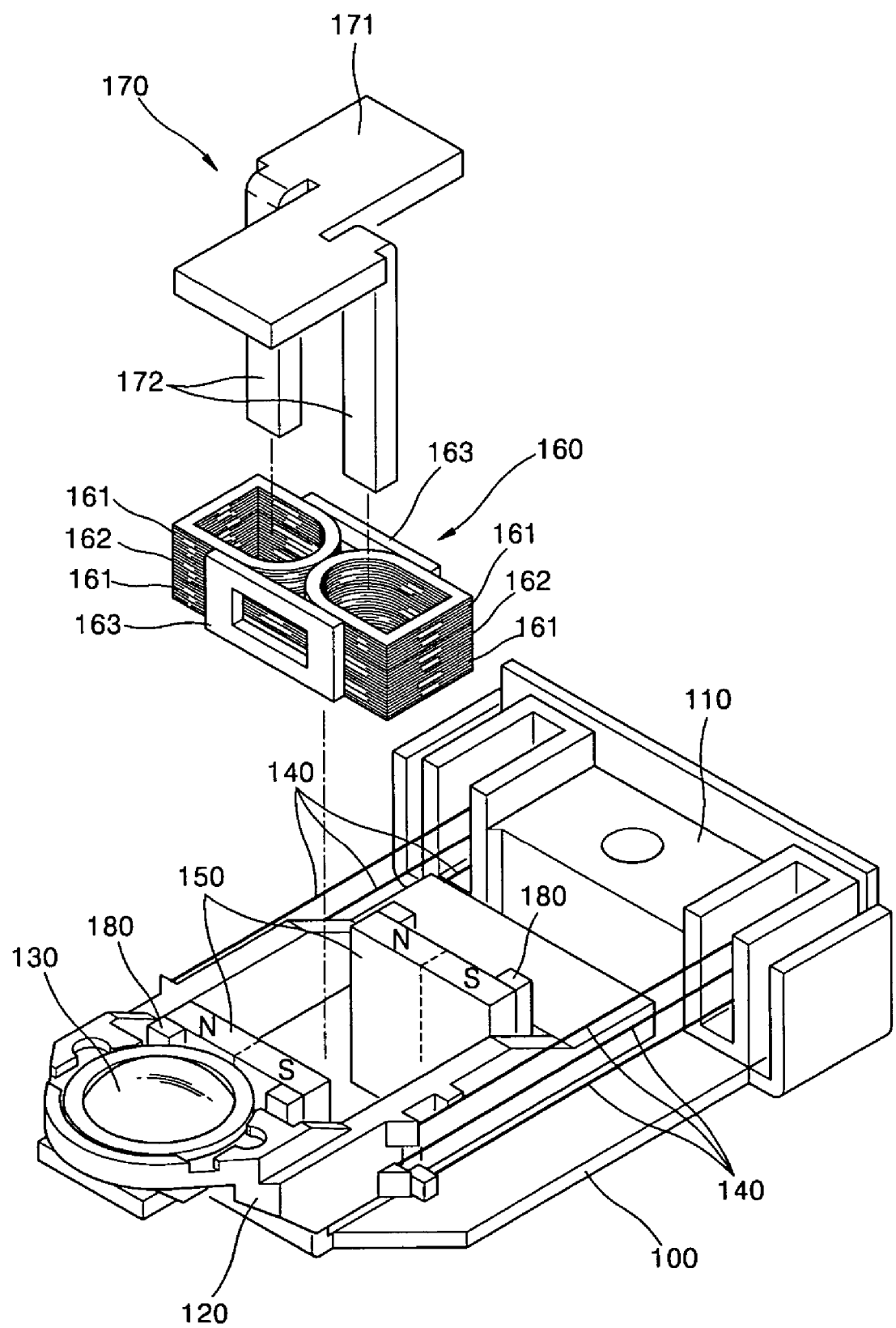
FIG. 4 is an exploded perspective view illustrating the objective lens driving apparatus of FIG. 3.

Referring to FIGS. 3 and 4, a holder 110 is provided on a base 100. A blade 120 on which an objective lens 130 is mounted is supported by a plurality of wires 140 capable of elastically moving with respect to the holder 110. A pair of outer yokes 180 are installed on the base 100 and a pair of magnets 150 are installed at the outer yokes 180 to face each other. A coil assembly 160 is installed at the center portion of weight of the blade 120 and is arranged between the magnets 150.

Each of the magnets 150 is polarized into two poles. The magnets 150 are installed such that the same poles of the magnets 150 face each other. The coil assembly 160 disposed between the magnets 150 includes tilt coil 162 focus coils 161 which are vertically disposed and disposed on each of the upper and lower side sides of the tilt coil 162, and tracking coils 163 attached to opposite side surfaces of the tilt coils 162 and the focus coils 161 to face the magnets 150. That is, unlike conventional coils which are dispersedly arranged, the coils are incorporated into one coil assembly 160 and arranged between the magnets 150 so that an installation space can be reduced.

Also, a top cover 170 is provided which includes a top yoke 171 magnetically connecting the outer yokes 180 by contacting top ends of the outer yokes 180 from the upper portion of the coil assembly 160, and an inner yoke 172 extending from the top yoke 171 to penetrate the center of the deposited focus coil 161 and the tilt coil 162 and coupled to the base 100. The top cover 170 has a function to concentrate lines of magnetic force generated between the magnets 150 toward the coil assembly 160.

Figure 5:
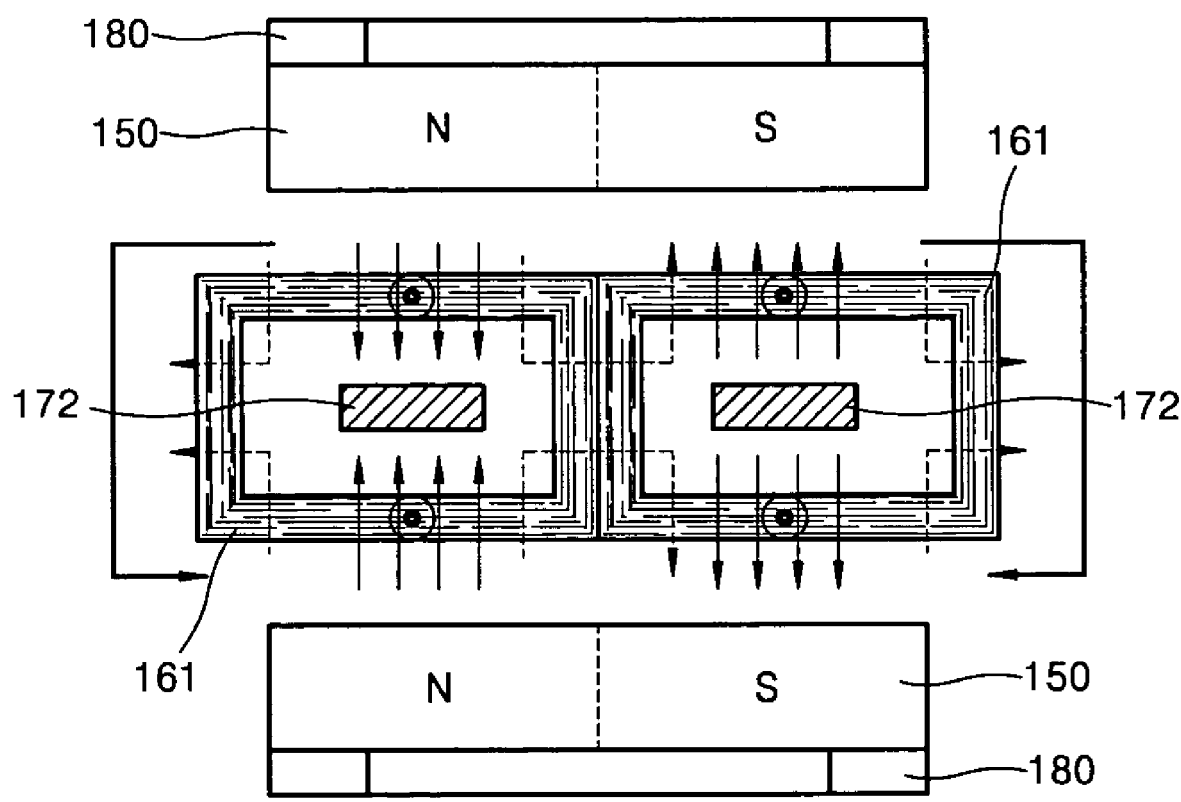
FIG. 5 is a view explaining driving of the objective lens driving apparatus of FIG. 3 in a focusing direction.
Figure 5:
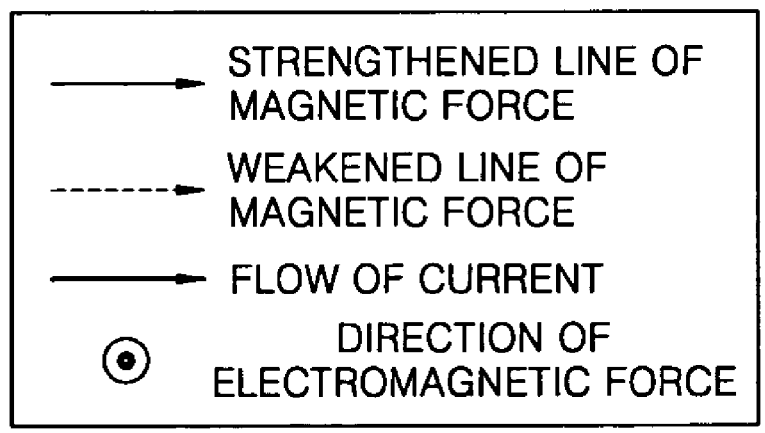

In the above structure, it is assumed that the blade 120 is driven in the focus direction. For example, when current flows through the focus coil 161 as shown in FIG. 5, an electromagnetic force is generated in an ascending direction by the interaction with lines of magnetic force generated by the magnets 150. Of course, if the current flows in the opposite direction, the electromagnetic force is generated in the opposite direction. However, in the present invention, an effective length of each focus coil 161 contributing to the generation of the electromagnetic force is double the effective length in the conventional technology. That is, in the conventional structure shown in FIG. 1, since only one side of the focus coil 3 is disposed between the magnets 8, the current flowing on the other side is not used for control.

In contrast, in the structure according to an aspect of the present invention, since the entire coil assembly 160 is disposed between the magnets 150 which are polarized into two poles, the front and rear sides of the focus coils 161 facing the respective magnets 150 act as effective coils, as shown in FIG. 5. Thus, when the same current is provided, a quite high control sensitivity can be obtained. In addition, since the inner yoke 172 of the top cover 170 concentrates the lines of magnetic force toward the coil assembly 160, the control sensitivity increases further. That is, if the inner yoke 172 is not present, lines of magnetic force traveling from the N pole to the S pole of the respective magnets 150 and lines of magnetic force passing a portion of the focus coil 161 which is not an effective coil are strengthened so that an efficiency in control is lowered. However, when the inner yoke 172 is installed as in the present invention, the lines of magnetic force are concentrated in a direction to pass the effective coil and the other unnecessary components are weakened, so that the control sensitivity is increased further. Thus, although different coils are incorporated into the one coil assembly 160 and arranged in a narrow space, the effective length used for control is greater than that according to the conventional technology.

Figure 2:
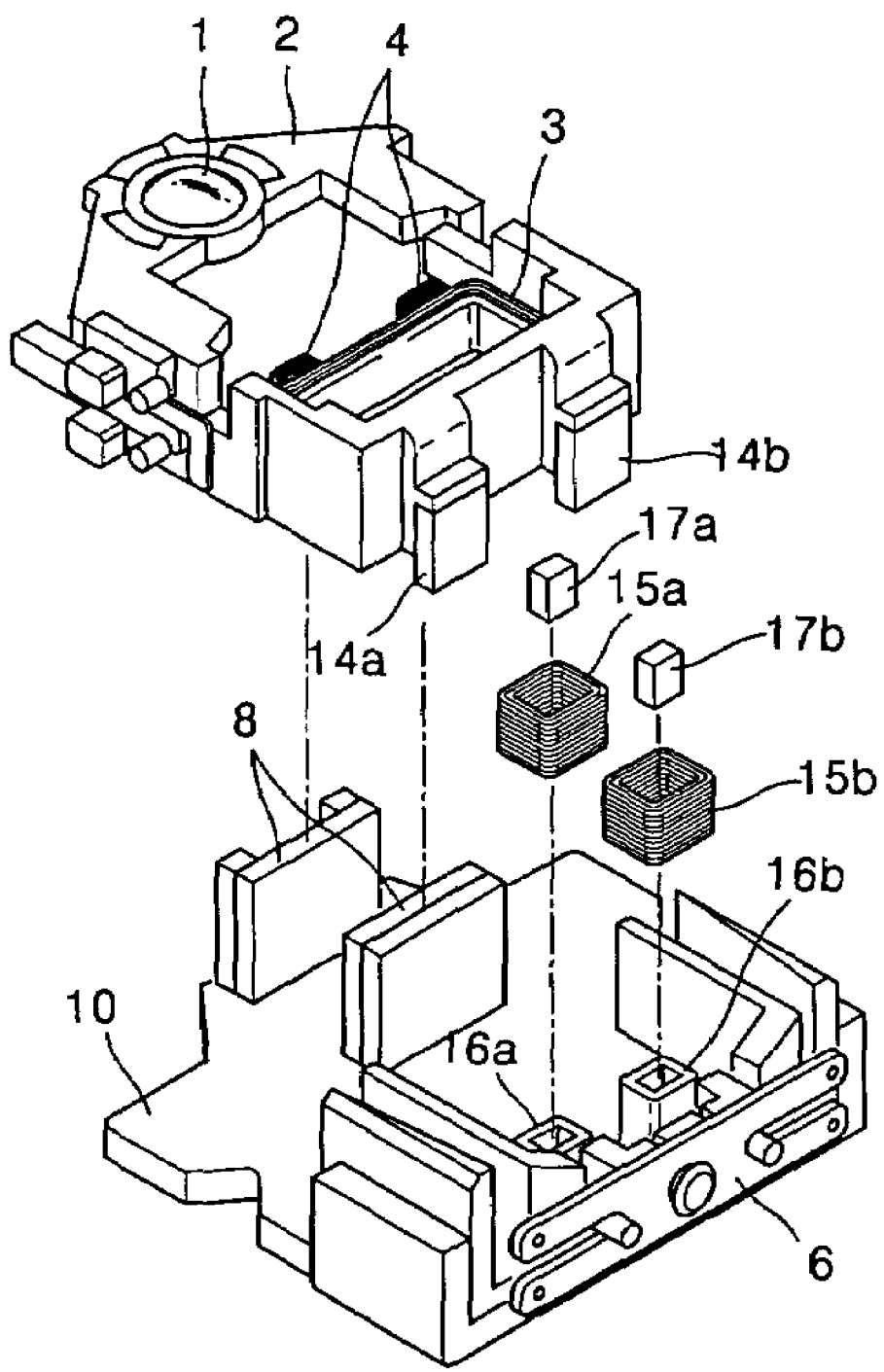
FIG. 2 is an exploded perspective view illustrating the objective lens driving apparatus of FIG. 1.
Figure 6:
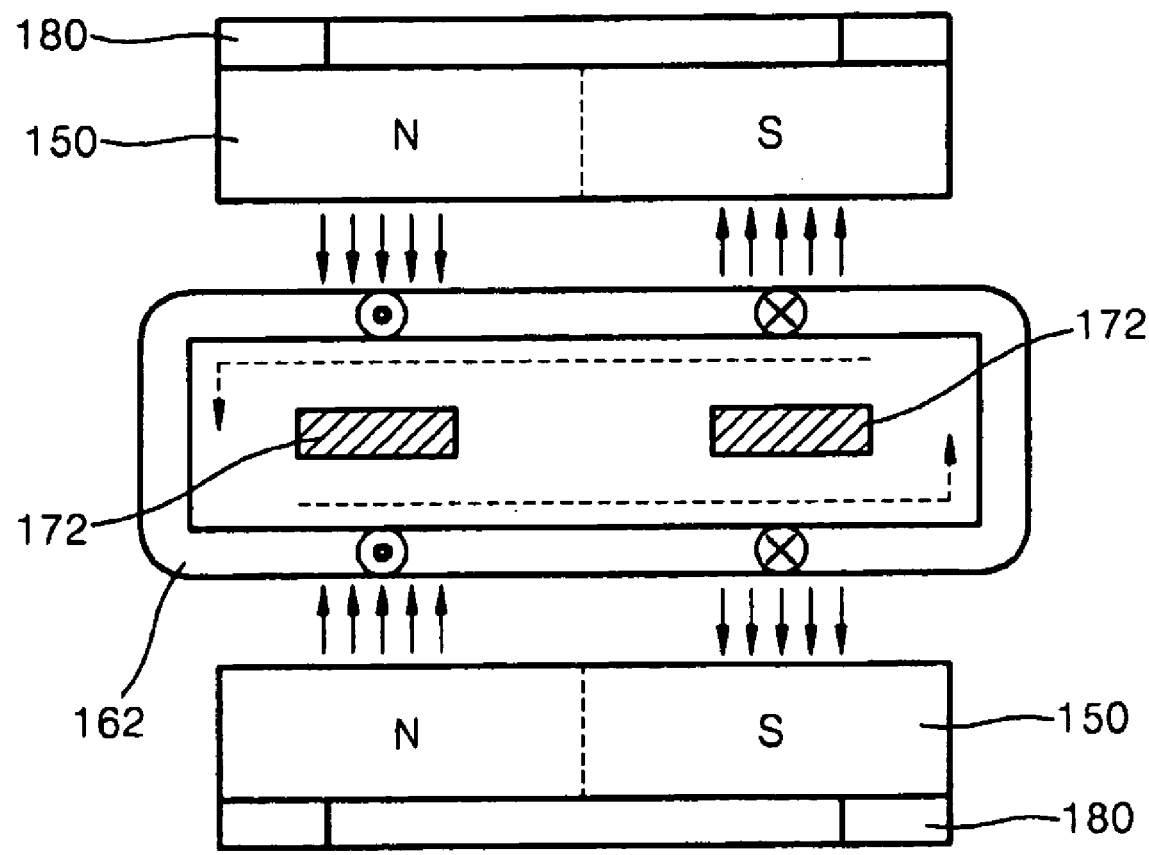
FIG. 6 is a view explaining driving of the objective lens driving apparatus of FIG. 3 in a tilt direction.
Figure 6:
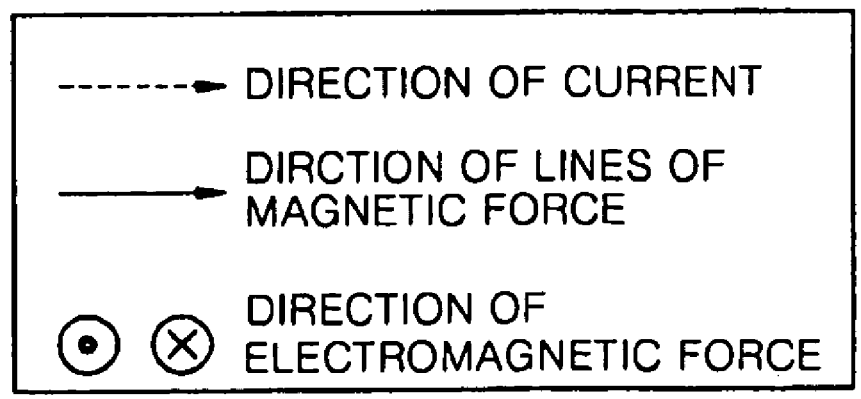

Next, when the blade 120 is driven in the tilt direction, current is supplied to the tilt coil 162 as shown in FIG. 6. Then, by the interaction with the magnets 150, electromagnetic forces are generated in an ascending direction at the left side of the drawing and in a descending direction at the right side of the drawing so that the blade 120 is rotated in the tilt direction. To rotate the blade 120 in the opposite direction, current is supplied in the opposite direction. In this case, it can be seen that the effective length of the coil is extended. That is, in the conventional technology, one side surface of each of the tilt coils 15a and 15b is disposed between the magnets 14a and 14b which are magnetic members and the steel wires 17a and 17b, as shown in FIG. 2. However, in the present invention, since the front and rear surfaces of the tilt coil 162 facing the magnet 150 act as effective coils, the control sensitivity can be improved.

Figure 7:
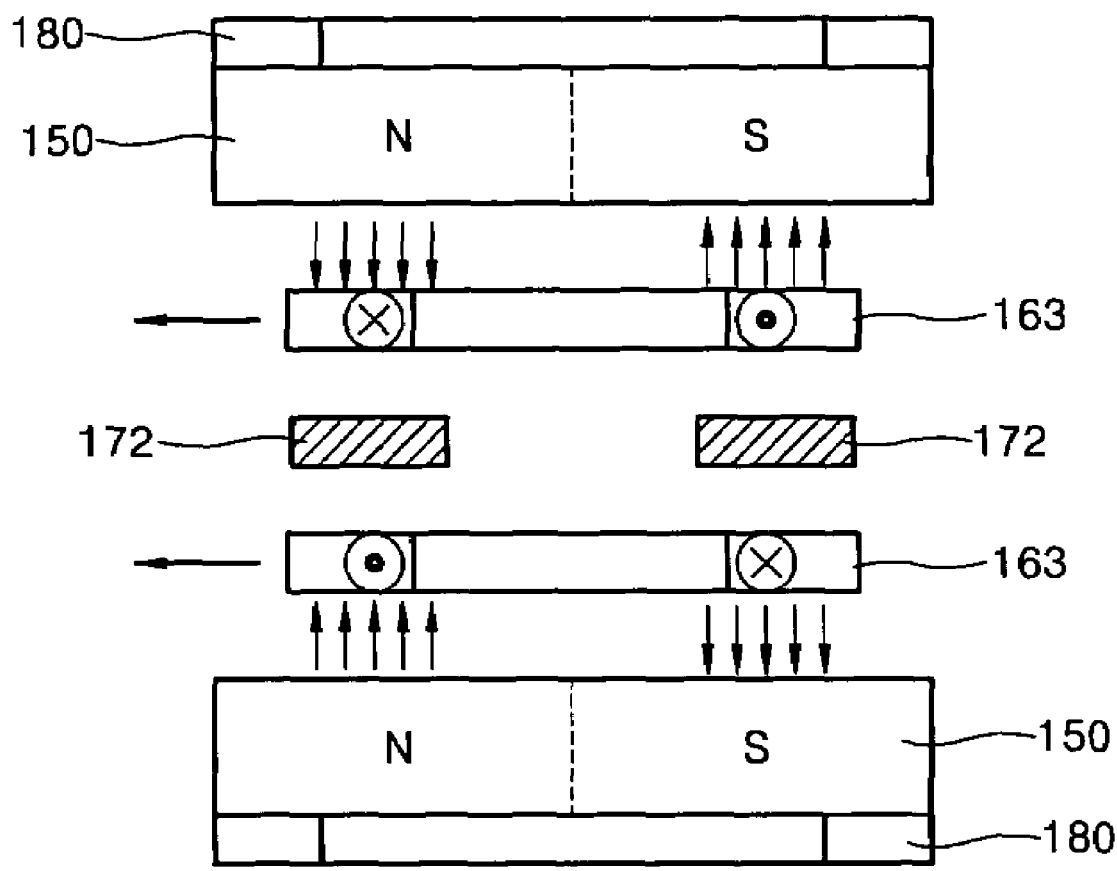
FIG. 7 is a view explaining driving of the objective lens driving apparatus of FIG. 3 in a tracking direction.
Figure 7:
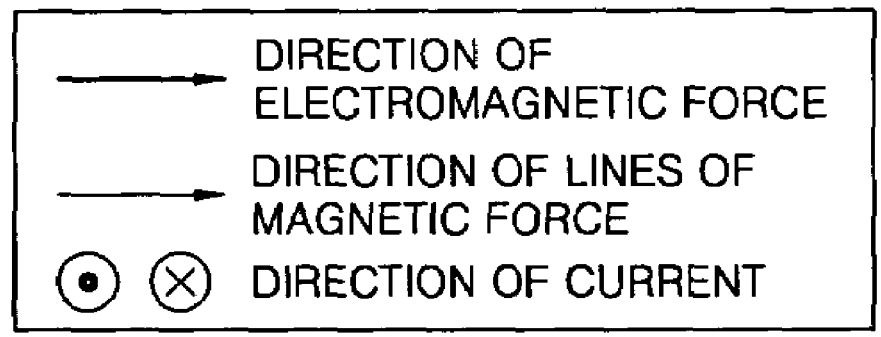

Also, tracking control uses the electromagnetic force generated by the interaction between the current flowing in the tracking coil 163 and the magnet 150. Thus, when current flows in the tracking coil 163 as shown in FIG. 7, an electromagnetic force is generated in the left direction on the drawing by the interaction with the magnet 150. If the current flows in the opposite direction, the electromagnetic force is formed in the opposite direction. Thus, when the blade 120 is driven by the electromagnetic force, tracking control is performed. In this case, since the respective vertical surfaces of the tracking coils 163 attached to both sides of the focus coils 161 and the tilt coil 162 are used as an effective coil reacting on the polarized magnet 150, an effective length of the coil extends compared with the conventional technology in which the tracking coil 4 is installed on one side of the focus coils 3, as shown in FIG. 1. Thus, the control sensitivity can be improved in the tracking control.

In the present invention, since the focus coils 161, the tilt coil 162, and the tracking coils 163 are incorporated into the coil assembly 160 and arranged in a limited space between the magnets 150, an installation space can be greatly reduced. Also, although the installation space is limited, an effective length of a coil used to control the respective coils is extended so that the control sensitivity can be improved.

Figure 8:
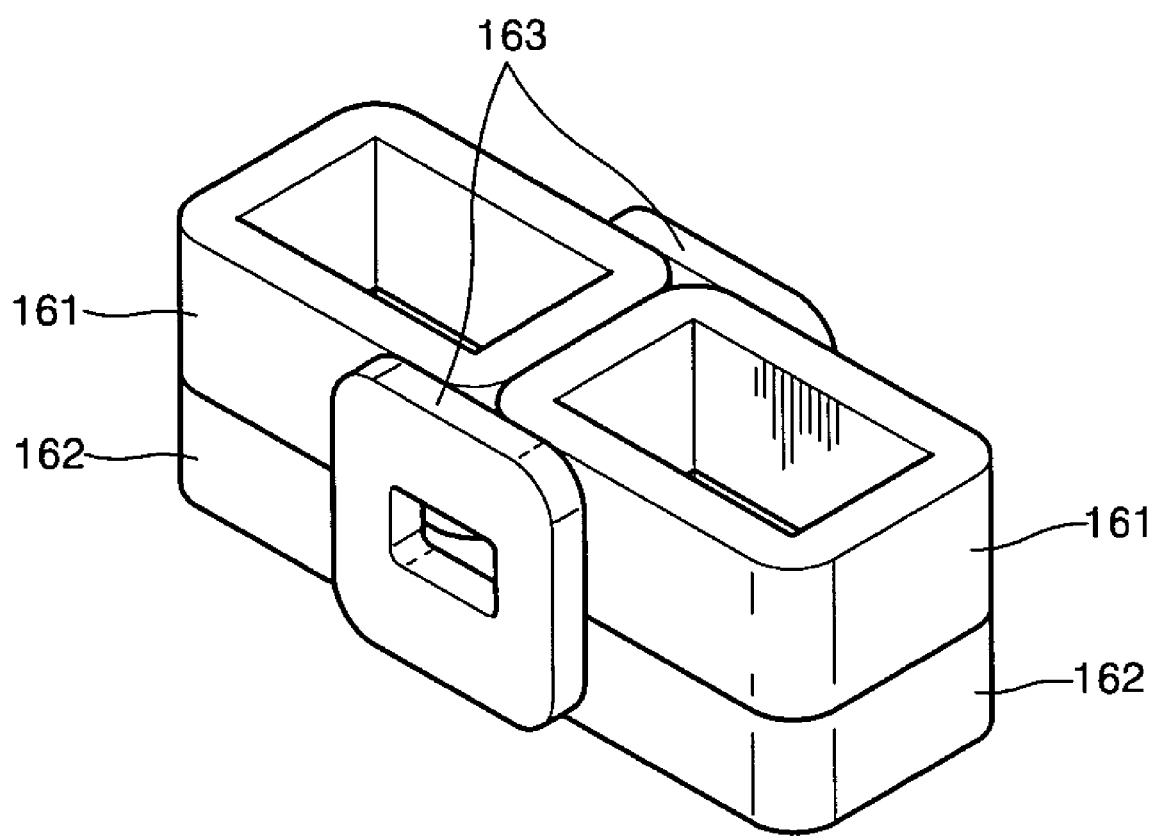
FIG. 8 is a perspective view illustrating an example of a coil assembly in the objective lens driving apparatus of FIG. 3.

In the above-described embodiment, as the structure of the coil assembly 160, the tilt coil 162 is disposed between the focus coils 161 such that the focus coils 161 are disposed on corresponding upper and lower sides of the tilt coil 162 and the tracking coils 163 are attached on both side surfaces thereof. According to another aspect of the invention as shown in FIG. 8, the focus coils 161 can be installed on only one of the upper and lower sides of the tilt coil 162 and the tracking coils 163 are attached to each of both sides thereof.

Figure 9A:
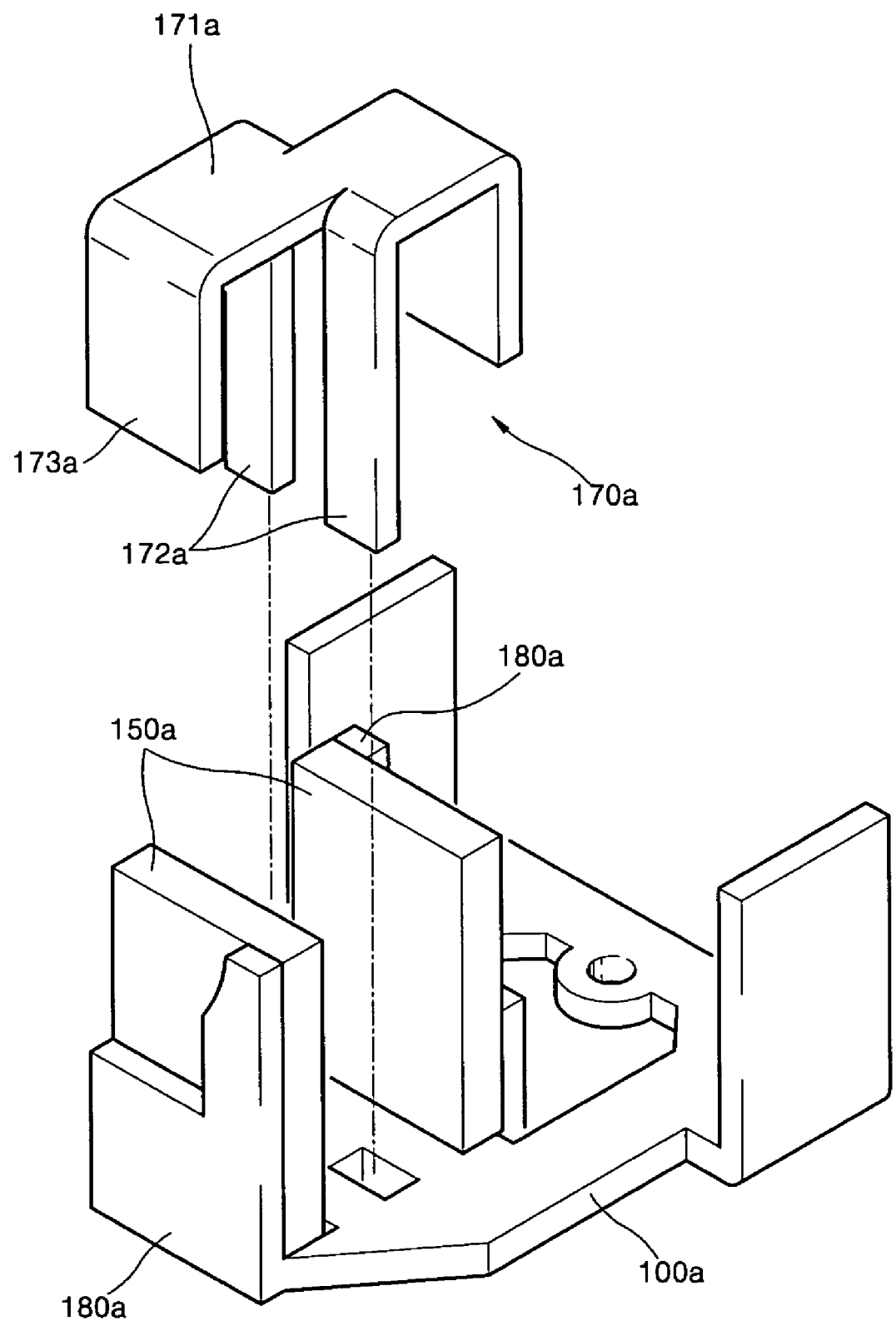
FIGS. 9A through 10B are views illustrating examples of a top cover in the objective lens driving apparatus of FIG. 3.
Figure 9B:
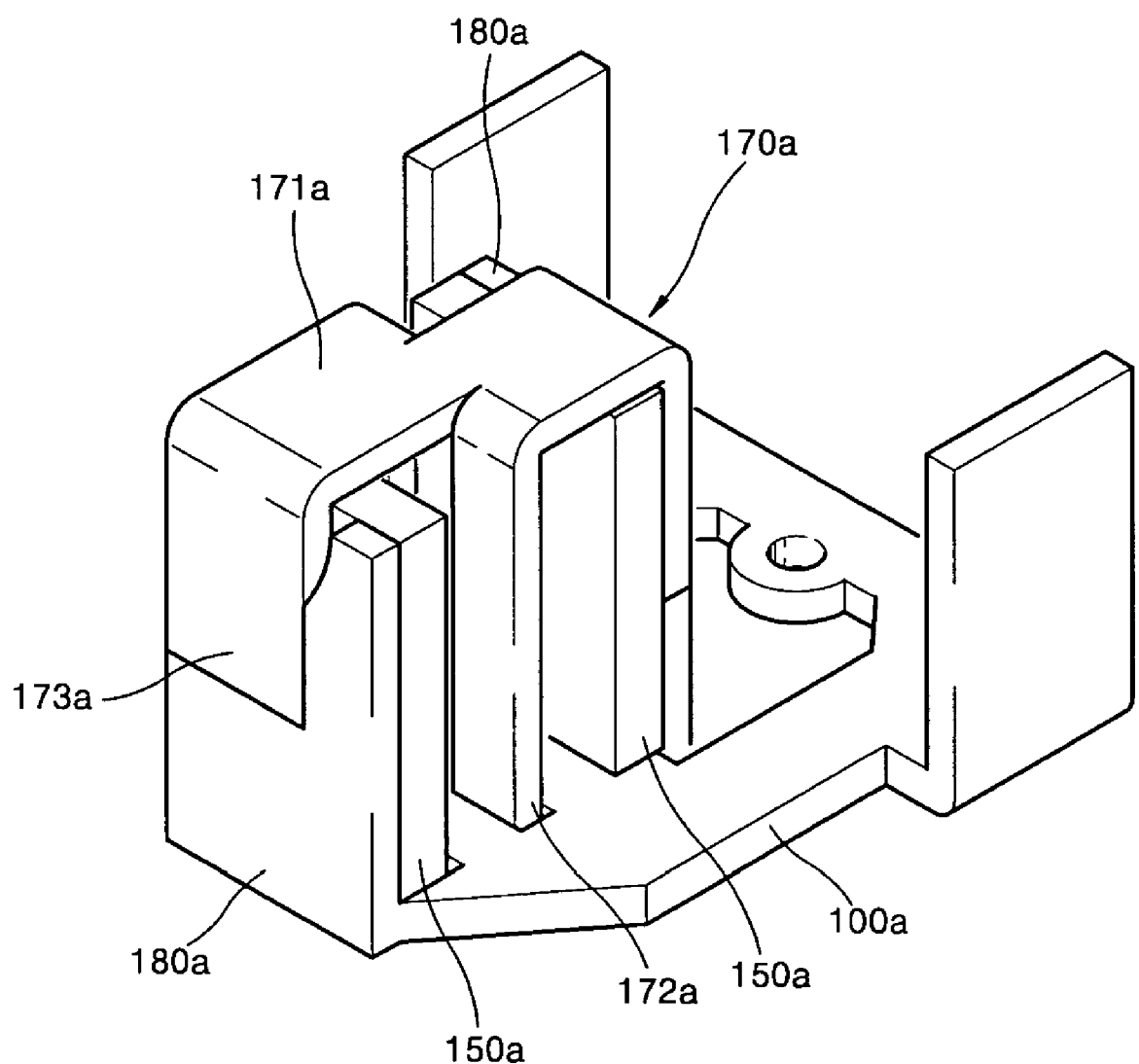

Also, the structure of the top cover 170 can be modified into a variety of shapes as shown in FIGS. 9A through 10A according to aspects of the invention. That is, although the top cover 170 includes the top yoke 171 and the inner yoke 172 in the embodiment shown in FIG. 3, the top cover 170 may further include a partial outer yoke 173a as shown in FIGS. 9A and 9B. In this embodiment, a first partial outer yoke 180a provided on a base 100a supports a magnet 150a, and when an inner yoke 172a of a top cover 170a is coupled to the base 100a, a second partial outer yoke 173a extending from the top yoke 171a of the top cover 170a is coupled to the first partial outer yoke 180a of the base 100a so as to support the magnet 150a.

Figure 10A:
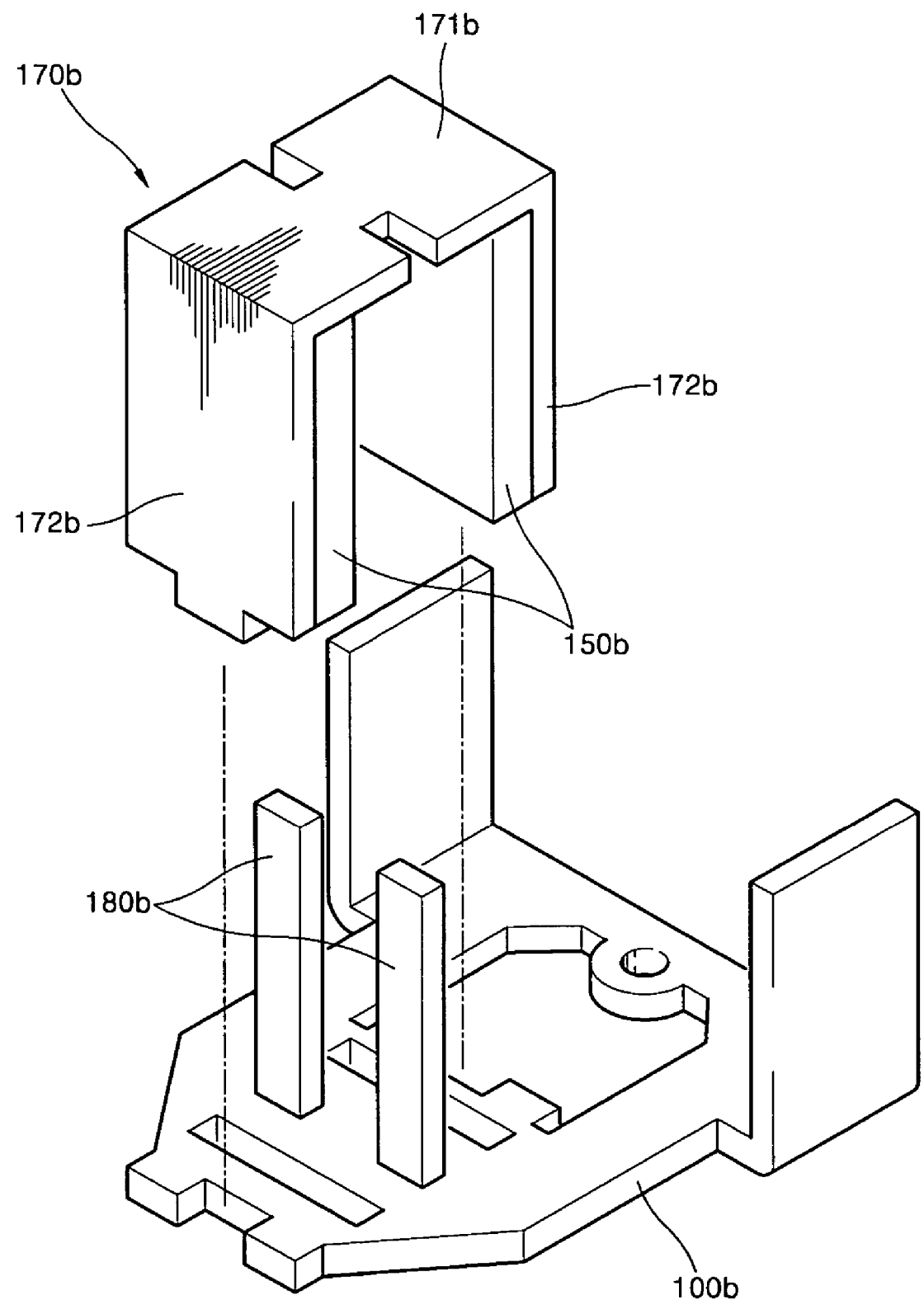
Figure 10B:
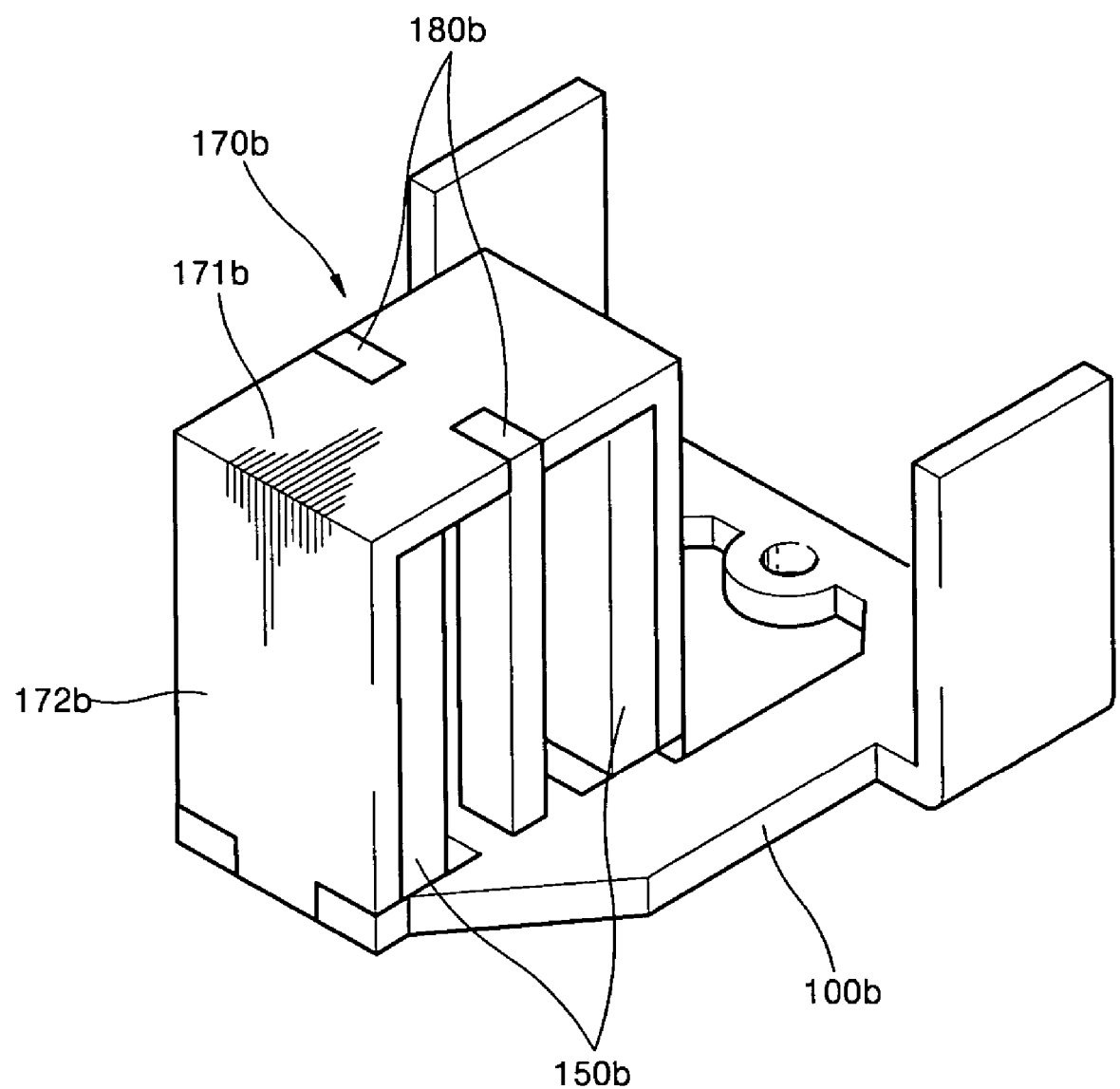

Further, as shown in FIGS. 10A and 10B, an inner yoke 180b is provided on a base 100b, and a top yoke 171b and an outer yoke 172b to which a magnet 150b is fixed are provided on a top cover 170b, so that the top cover 170b is coupled to the base 100b. In any case, the magnets 150, 150a, and 150b polarized into two poles are adopted so as to produce a very effective control sensitivity together with the coil assembly 160 arranged in the limited small space between a pair of the polarized magnets.

Figure 11:
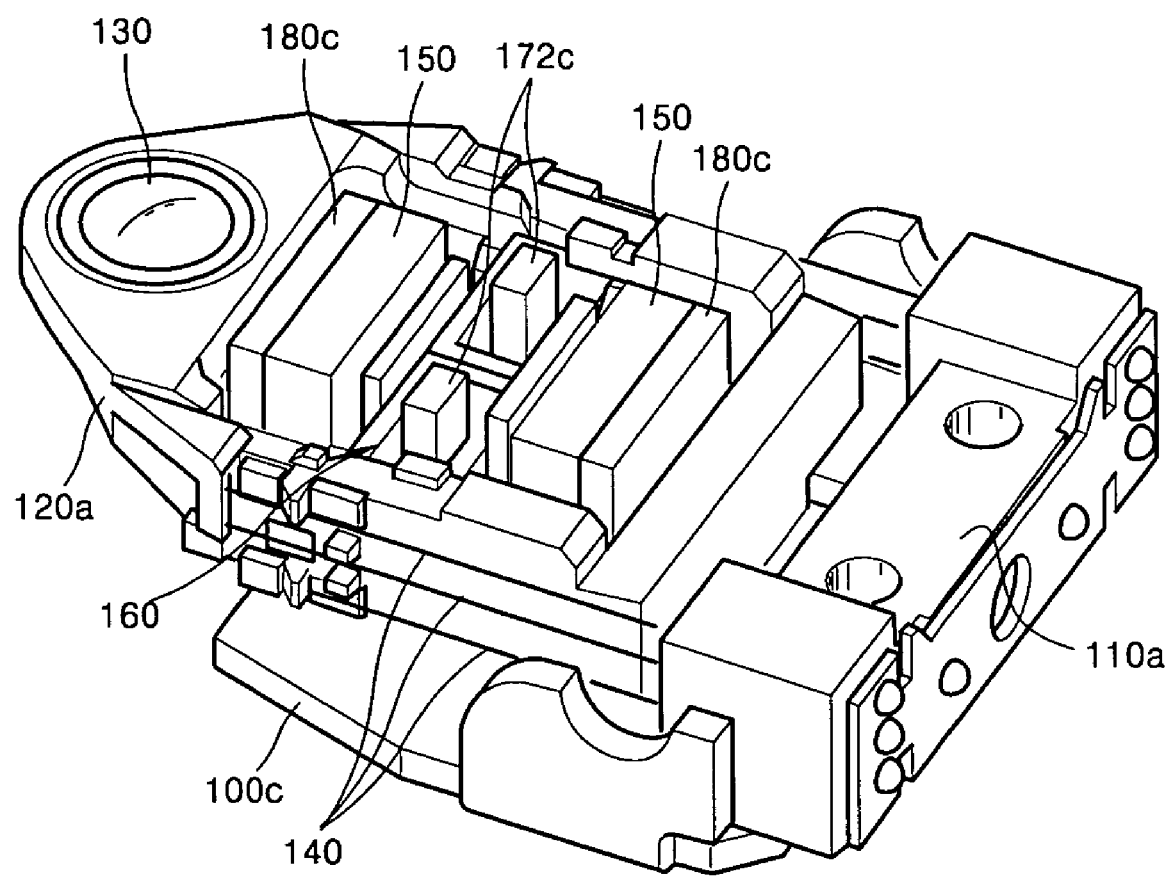
FIG. 11 is a perspective view illustrating another example of inner and outer yokes in the objective lens driving apparatus in the FIG. 3.
Figure 12:
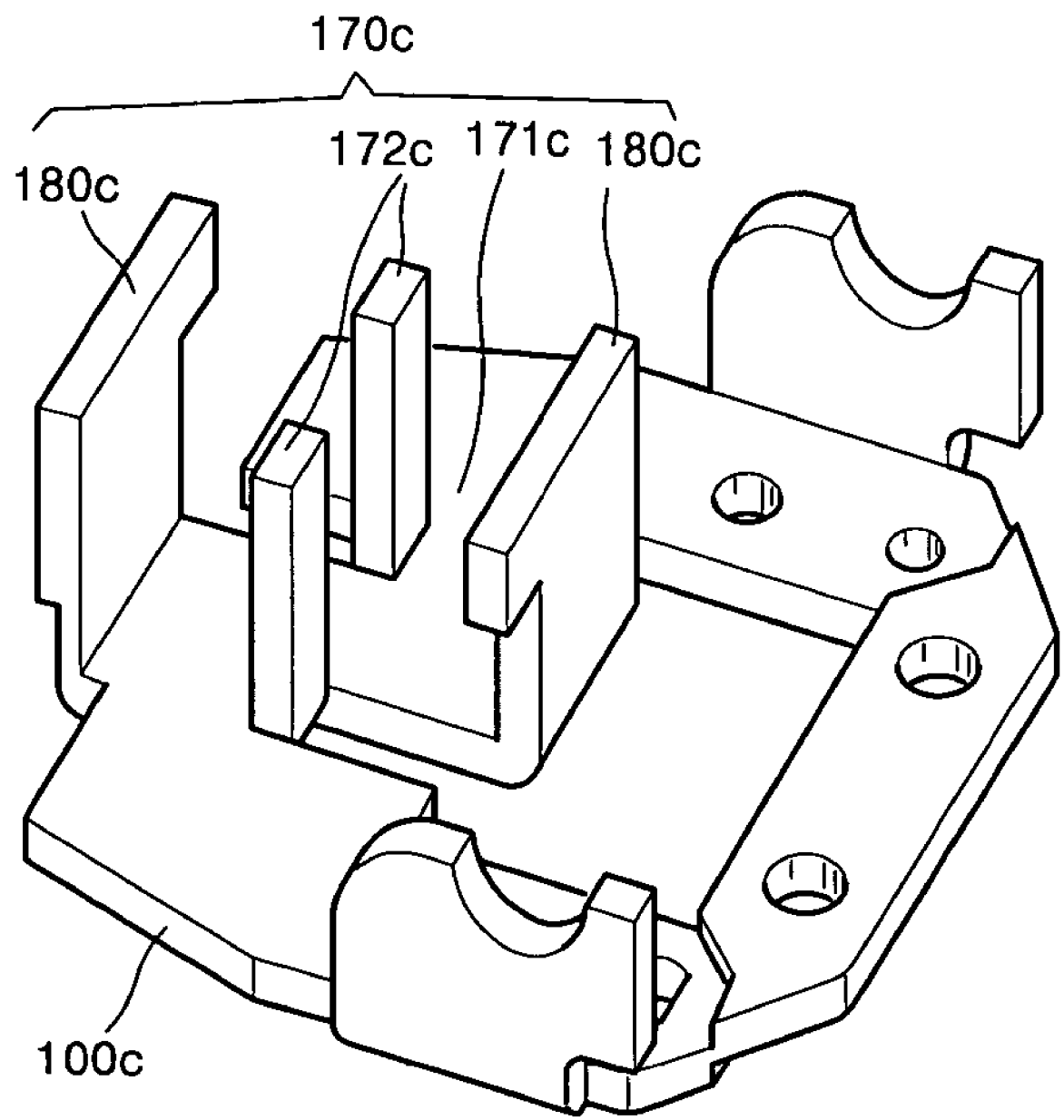
FIG. 12 is a detailed perspective view illustrating the base of FIG. 11.

FIG. 11 is a perspective view illustrating another example of inner and outer yokes 172c, 180c in an objective lens driving apparatus according to another aspect of the invention, and FIG. 12 is a detailed perspective view illustrating the base of FIG. 11. Referring to FIG. 11, a holder 110a is provided on a base 100c. A blade 120a on which an objective lens 130 is mounted is supported by a plurality of wires 140 capable of elastically moving with respect to the holder 110a. A coil assembly 160 is installed at the center portion of weight of the blade 120a. A pair of magnets 150 is installed between the pair of outer yokes 180c. The coil assembly 160 is disposed between the pair of magnets 150, and the pair of inner yokes 172c is disposed in the center of the coil assembly 160.

Referring to FIG. 12, a pair of the outer yokes 180c, a pair of the inner yokes 172c, and a connection yoke 171c are provided on the base 100c. The connection yoke 171c connects the pair of outer yokes 180c to the pair of inner yokes 172c. Although not shown, it is understood that the pair of outer yokes 180c, the pair of inner yokes 172c, and the connection yoke 171c may be incorporated into a yoke assembly 170c and combined with the base 100c according to an aspect of the invention. However, it is generally preferable that the pair of outer yokes 180c, the pair of inner yokes 172c, and the connection yoke 171c be formed with the base 100c into a single body as shown in FIG. 12.

As an aspect of the present invention, the pair of outer yokes 180c and the pair of inner yokes 172c may be formed by bending portions of the base 100c upwardly. Here, in order to maximize the width of the pair of inner yokes 172c, it is preferable, but not required, that the portions of the base 100c are bent using a lancing technique which does not require blacking. However, it is understood that other bending techniques could be used, and that other mechanism can be used to form the pair of outer yokes 180c and the pair of inner yokes 172c on the base 100c.

Accordingly, when the pair of outer yokes 180c, the pair of inner yokes 172c, the connection yoke 171c, and the base 100c are formed into a single body, less components are needed than where the objective lens driving apparatus includes the top cover 170, 170a, or 170b. In addition, the height of the objective lens driving apparatus can be further reduced.

As described with reference to FIGS. 3 through 8, in the above-described structure, an effective length of a coil used to control respective coils in a limited space is longer, which results in an improved control sensitivity.

As described above, the objective lens driving apparatus of an optical pickup according to the embodiments of the present invention has the following advantages. Since the coils needed to change the position of an objective lens such as focus coils, a tilt coil, and tracking coils are incorporated into a single coil assembly and arranged between a pair of magnets, an installation space is small so that the apparatus can be made compact. In addition, the control sensitivity can be improved by extending an effective length of a coil by appropriately matching the magnet polarized into two poles and the coil assembly. Further, since the respective coils in the coil assembly are arranged to interact with the magnets polarized into two poles, an additional magnet for the tilt coil is not needed unlike in the conventional technology so that the driving portion can be made lightweight. Moreover, a pair of outer yokes, a pair of inner yokes, a connection, and a base can be formed into a single body. Thus, a small number of components can be needed and the height of the objective lens driving apparatus can be reduced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An objective lens driving apparatus used with an optical pickup, comprising:
    a base;
    a holder provided on the base;
    a blade on which an objective lens is mounted;
    an elastic support body elastically supporting the blade so as to be moveable with respect to the holder;
    a pair of magnetic members installed on the base to face each other; and
    a coil assembly including at least one focus coil, at least one tracking coil, and a tilt coil and installed at the blade so as to be disposed between the magnetic members,
    wherein, in the coil assembly, the tilt coil and the at least one focus coil are respectively placed in the upper and lower portions of the coil assembly and the at least one tracking coil is attached to at least one side surface of the tilt and focus coils.

2. The apparatus as claimed in claim 1, further comprising:
    a pair of outer yokes provided on the base to fixedly support the magnetic members; and
    a top cover including an inner yoke fixed to the base by penetrating a center of the coil assembly and a top yoke contacting top ends of the outer yokes from the coil assembly.

3. The apparatus as claimed in claim 1, further comprising:
    a top cover coupled to the base and including a top yoke disposed above the coil assembly and a pair of outer yokes provided such that the magnetic members are fixed to both end sides of the top yoke; and an inner yoke provided on the base to penetrate the center of the coil assembly.

4. The apparatus as claimed in claim 1, further comprising:

a first partial outer yoke provided on the base by which part of the magnetic members are fixedly supported; and a top cover coupled to the base and including an inner yoke fixed to the base by penetrating a center of the coil assembly, a top yoke disposed above the coil assembly, and a second partial outer yoke extending from the top yoke and coupled to the first partial outer yoke, forming an entire outer yoke by which the magnetic members are fixedly supported.

5. The apparatus as claimed in claim 1, wherein the coil assembly is installed at the center of gravity of the blade.

6. The apparatus as claimed in claim 1, wherein the base comprises a pair of outer yokes which extend from the base and fixedly support the pair of magnetic members, a pair of inner yokes which extend from the base and penetrate a center of the coil assembly, and a connection yoke which connects the outer yokes to lower portions of the inner yokes.

7. The apparatus as claimed in claim 6, wherein the outer yokes, the inner yokes, the connection yoke, and the base are formed into a single body.

* * * * *